United States Patent
Piper

(10) Patent No.: US 8,418,462 B2
(45) Date of Patent: Apr. 16, 2013

(54) METHOD FOR MAXIMIZING TRANSIENT VARIABLE GEOMETRY TURBINE RESPONSE IN AN INTERNAL COMBUSTION ENGINE

(75) Inventor: Erik L. Piper, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 393 days.

(21) Appl. No.: 12/782,285

(22) Filed: May 18, 2010

(65) Prior Publication Data

US 2011/0283695 A1    Nov. 24, 2011

(51) Int. Cl.
*F02B 29/04* (2006.01)

(52) U.S. Cl.
USPC .............. 60/605.2; 60/600; 60/602; 60/603; 60/624; 123/568.11

(58) Field of Classification Search ........... 60/602, 60/603, 600, 605.2, 624; 123/568.11
See application file for complete search history.

(56) References Cited

U.S. PATENT DOCUMENTS

| | | | |
|---|---|---|---|
| 4,671,068 A | 6/1987 | Moody et al. | |
| 4,779,423 A | 10/1988 | Szczupak | |
| 4,928,489 A | 5/1990 | Inoue et al. | |
| 6,058,707 A | 5/2000 | Bischoff | |
| 6,067,800 A | 5/2000 | Kolmanovsky et al. | |
| 6,523,345 B2 | 2/2003 | Scherngell et al. | |
| 6,665,604 B2 | 12/2003 | Arnold | |
| 7,076,954 B1 * | 7/2006 | Sopko et al. ............ | 60/607 |

FOREIGN PATENT DOCUMENTS

GB        2460163 A       11/2009

* cited by examiner

*Primary Examiner* — Ching Chang
(74) *Attorney, Agent, or Firm* — Taylor IP, P.C.

(57) ABSTRACT

A method of operating a variable geometry turbine (VTG) during transient operations for maximum response by determining the VTG area at the balance condition of the pressure ratio and efficiency curves for the variable geometry turbine to achieve maximum power. The method includes measurements of turbine inlet pressure, turbine outlet pressure, turbine rpm, and other parameters used to measure turbine mass flow.

9 Claims, 4 Drawing Sheets

METHOD FOR MAXIMIZING TRANSIENT VARIABLE GEOMETRY TURBINE RESPONSE IN AN INTERNAL COMBUSTION ENGINE

BACKGROUND OF THE INVENTION

1. Field of the Invention

The invention relates to variable geometry turbochargers for internal combustion engines and, more specifically, to control schemes for such variable geometry turbines.

2. Description of the Related Art

The turbocharger was first proposed by Dr. Alfred Buchi at the beginning of the Twentieth Century. The turbocharger or turbo supercharger, as otherwise known, was an advanced concept to increase the efficiency of internal combustion engine and, more specifically, compression ignition engines. The turbocharger included a turbine, driven into rotation by the otherwise wasted products of combustion from the engine, and connected to a compressor for pressurizing the inlet air to the engine for combustion to a pressure level higher than the ambient pressure. Such a system allowed greater density of the charge mixture and, therefore, greater given output for an engine so equipped. Over the years, the deficiency of the turbocharger in responding to transient operator demand increases was addressed by variable geometry turbines (VTG). In such an arrangement, the turbine inlet area is variably reduced either by a movable ring or variable inlet guide vanes to provide a lower flow area into the turbine and, therefore, a higher gas flow velocity which, in turn, acted on the turbine to increase the power to the compressor and, thus, the response to the step increase in operator demand.

The request for increased power is complicated by the overlay of emissions regulations on the primary operational parameters of a compression ignition engine of power and efficiency. The emissions requirements generally mean that acceleration of an engine is smoke limited, that is, the fueling cannot exceed an amount relative to the available air flow that generates smoke in the form of particulates. Such a requirement alters the mechanism and control scheme for controlling the variable geometry turbine in such a way that smoke is avoided. However, such control schemes leave very much to be desired in terms of responsiveness of the variable geometry turbine in smoke limiting situations.

Accordingly, what is needed in the art is a control system for a variable geometry turbine that maximizes responsiveness to transient increases in demand, or turbine power output.

SUMMARY OF THE INVENTION

In one form, the invention is a method for controlling the variable geometry turbine (VTG) of a turbocharger for an operator controlled, air breathing, fuel consuming, compression ignition internal combustion engine having an operator controlled fueling rate and a maximum permissible fueling rate to produce maximum transient response. The method includes the steps of determining if operator controlled fueling rate exceeds the maximum fueling rate. The method further includes calculating the pressure ratio of the turbine as a function of the area of the VTG and calculating turbine efficiency as a function of the area of the VTG, determining the balance between pressure ratio and efficiency and commanding the VTG area as a direct function of the balance condition to achieve maximum turbine power.

In a more specific form, the method includes the step of determining the instantaneous turbine mass flow rate (W), and determining instantaneous turbine inlet temperature ($T_i$), and determining turbine exit pressure ($P_o$) to calculate the balance condition of the turbine pressure ratio and turbine efficiency.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
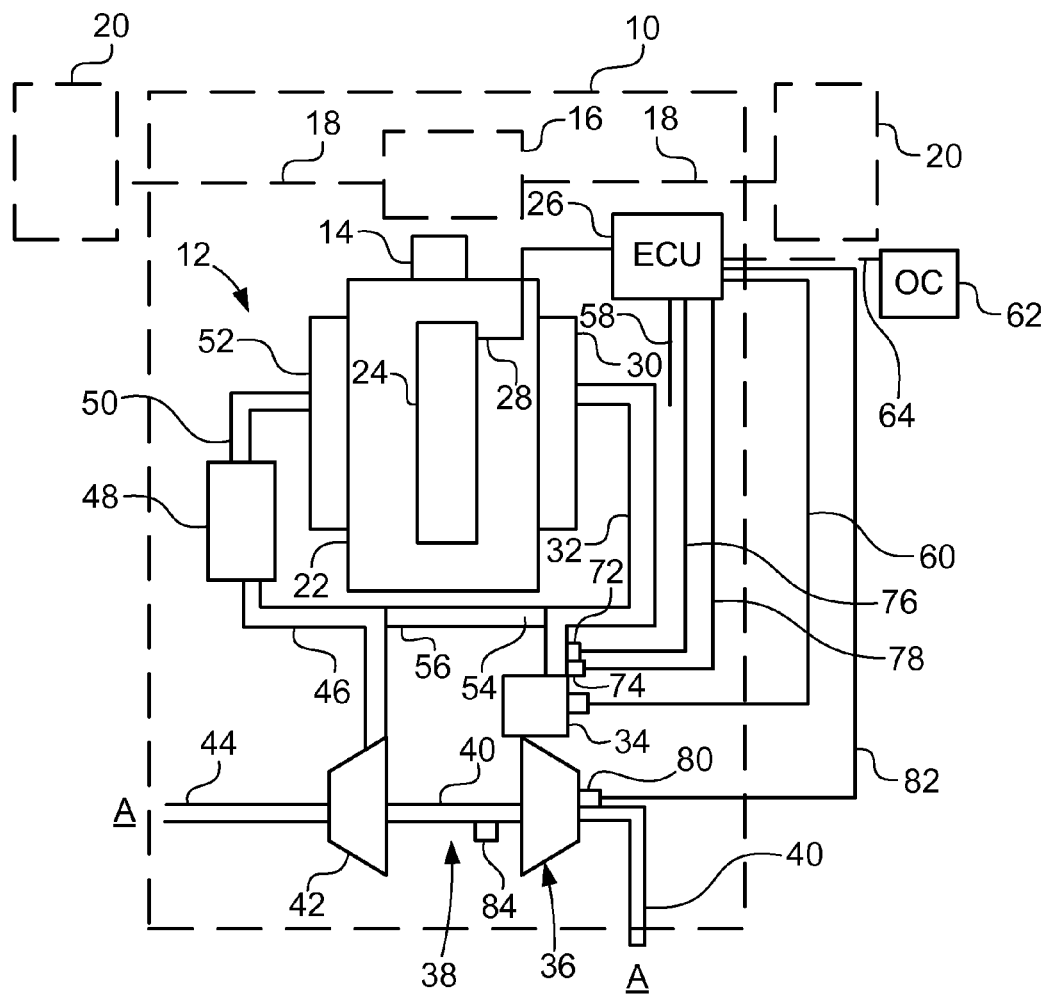
FIG. 1 is a schematic illustration of a work machine including an internal combustion engine embodying the present invention.

Referring now to the drawings, and more particularly to FIG. 1, there is shown a work machine 10 having a prime mover 12 in the form of a compression ignition internal combustion engine 12 providing a rotary power output through output shaft 14 to a power distribution device 16 providing work functions in machine 10 and providing ground movement through mechanical interconnections 18 to ground drive wheels 20. The work machine 10 may have a variety of rotary load requirements affecting the need for instantaneous power increases. Such an example would be the initiation of the operation of a combine harvesting and processing operation while the work machine 10 is traversing a field. Another example may be a forestry machine, which has a saw or grappling hook instantaneously engaged to remove trees and, thus, requiring a significant increase in power output. Still another would be the imposition of an electrical load on a generator driven by internal combustion engine 12.

Internal combustion engine 12 is preferably a compression ignition, or diesel, engine in which the air for combustion is compressed to the point that injection of fuel produces combustion and a work output. Engine 12 has a crank case 22 in which a plurality of pistons (not shown) are reciprocally mounted and connected to a crank shaft extending to an output shaft 14. The pistons form combustion chambers that receive air for combustion and fuel injected via a fuel system 24 into individual cylinders in appropriate quantities at appropriate times in the engine cycle produces combustion that satisfies engine output demands while meeting emissions requirements, fuel efficiency, and power output.

Fuel system 24 may be one of a number of fuel systems, including unit injectors, in which pressure is generated at the injector, distributor pumps in which the pressure is generated elsewhere and distributed to the individual injectors, or, most recently, high pressure common rail fuel systems in which a high pressure exists in a common manifold adjacent the injector and appropriate control valves perform the function of injecting the fuel according to the control parameters.

The fuel system 24 receives control inputs from an electronic control unit (ECU) 26 via line 28. Although line 28 is illustrated as a single line, it should be noted that it may have multiple interconnections between the ECU and the fuel system and that additional engine operating parameters may be provided to the ECU 26 for its control function.

When the engine completes the combustion cycle for each individual cylinder, the gaseous products are exhausted via appropriate exhaust valves to an exhaust manifold 30 and to an exhaust line 32 to a variable area inlet 34 of a turbine 36 of a turbocharger 38. Variable area device 34, as stated previously, controls the inlet area to the turbine 36 in order to increase or decrease the velocity of the exhaust gas flow into the turbine inlet. The variable area inlet for the turbine may take the form of a series of circumferentially positioned variable inlet guide vanes positioned adjacent one another so that synchronous pivoting of the vanes produces a greater or lesser flow area of gasses directed at the turbine. Another such variable area inlet 34, takes the form of a moveable ring that is displaced towards and away from a fixed annular surface to control the inlet area of the turbine 36. Such a system may include slotted vanes or may be plain, as appropriate. The products of combustion that have passed across turbine 36 pass via an exhaust line 40 to ambient A. Although not shown, various exhaust aftertreatment devices may be included in line 40 or even in line 36, as appropriate, to filter particulates and minimize or reduce oxides of nitrogen.

The turbocharger turbine 36 produces a rotary power output which is coupled via interconnecting shaft 40 to a compressor 42 for receiving ambient air A from an inlet line 44 for pressurization by virtue of the rotation of compressor 42. Inlet line 44 may have usual filtration mechanisms to ensure that the air consumed by the engine does not have harmful foreign matter. The output from compressor 42 passes via line 46 to an aftercooler 48, also known as an intercooler, to cool the pressurized charge from the compressor 42 and thus increase its density to provide additional power to engine 12. Aftercooler 48 may be an air-to-liquid type using engine coolant for the heat sink or, preferably, an air-to-air aftercooler in which the ambient air A is used to provide greater cooling. The output from after cooler 48 passes via line 50 to an inlet manifold 52 where the air is distributed to the engine cylinders by appropriate valve mechanisms to complete the engine cycle.

The engine 12 may also have exhaust gas recirculation (EGR) in which a valve 54 is interposed in a line 56 interconnecting exhaust line 32 to intake line 46. The EGR is preferably cooled to minimize the reduction in charge density to the engine 12 by virtue of the heated EGR gases.

Preferably, the control of the function for the engine 12 is integrated in ECU 26. For this purpose, the fuel system 24, EGR valve 54, and variable area inlet 34 are controlled by signal inputs from the ECU via line 28, a line 58, and line 60, respectively. The ECU 26 also receives command inputs designated as operator command, or OC, from device 62 via line 64. Such controls may be in the form of a power lever, governor increase, accelerator pedal, or generation of additional load inputs.

Whatever the source for the increased power requirement, the ECU 26 generates a signal to the fuel system 24 to increase fueling. In the engine system, fueling is accomplished almost instantaneously and easily exceeds the ability of the engine 12 to receive air matching the fuel without generating smoke as a result of what is known as over fueling. The maximum fueling is generally determined by selected engine operating parameters and controls the absolute level that fueling can be increased to the engine. In the past, this has resulted in attempts to crudely limit the acceleration of the turbocharger through the VTG control to accelerate or increase the power.

Figure 2A:
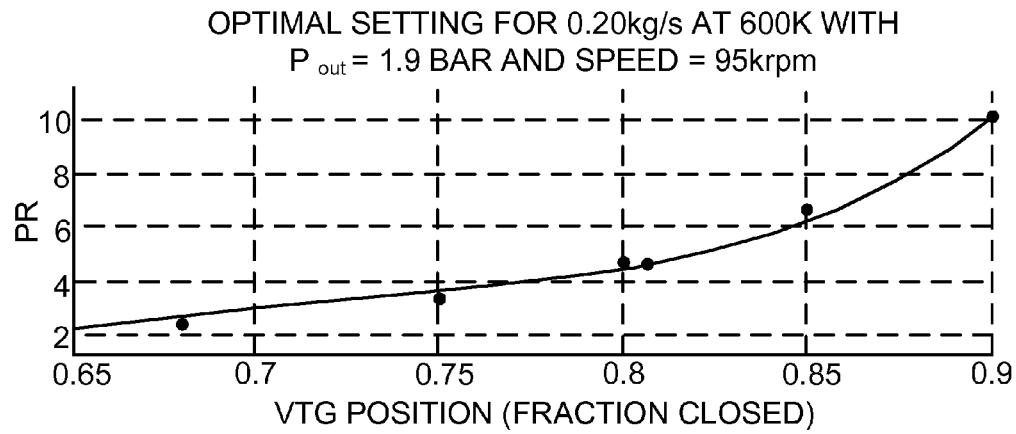
FIGS. 2A, 2B, and 2C represent variable geometry operating parameters as a function of the area of VTG.
Figure 2B:
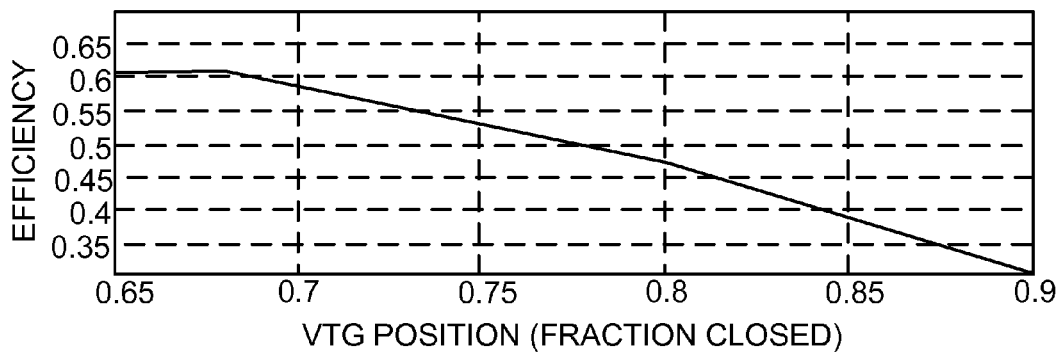
Figure 2C:
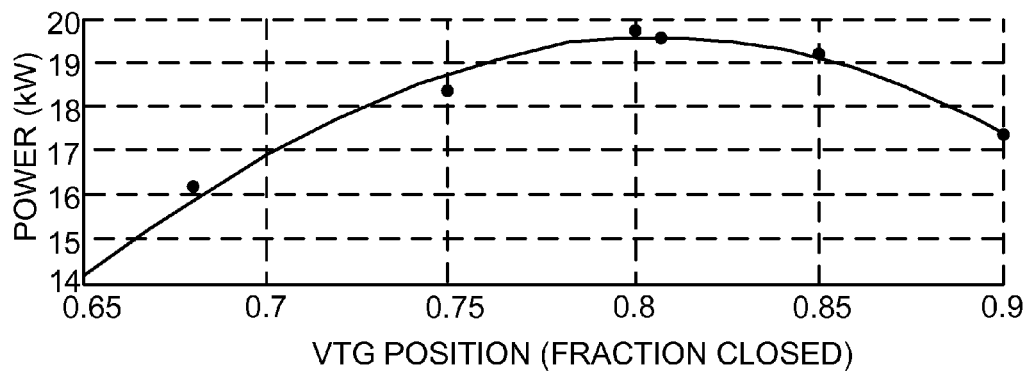

In accordance with the present invention, the geometry of the VTG is varied in a way that stays within emissions limits but provides increased responsiveness to the variable geometry turbine during transient conditions in smoke limited situations. This control method involves the recognition of the fact that, as shown in FIGS. 2A, 2B, and 2C, that the variable area inlet 34 of turbine 36, as a function of the fraction closed of the variable area device 34, increases the pressure ratio in FIG. 2A along curve 66 that shows pressure ratio increases as the area is reduced. FIG. 2B, however, shows that efficiency of the turbine 36, as a function of the fraction of area, reduces as shown by curve 68. When the pressure ratio and the efficiency balance, there is a turbine inlet area that maximizes power for a given condition of operating parameters. The condition illustrated by point 70 maximizes turbine power, which is the excess of available power for the turbine over the compressor power requirement and rotational inertia. As shown in FIG. 2C, the variable area position for peak power may be defined by the graph 2C in which power is shown as a function of the VTG area and in which the peak power for given conditions is a maximum at about 70. It should be noted that there is not a literal intersection since pressure ratio and efficiency are in different units. Nonetheless, an optimal area can be found for the VTG.

Figure 3:
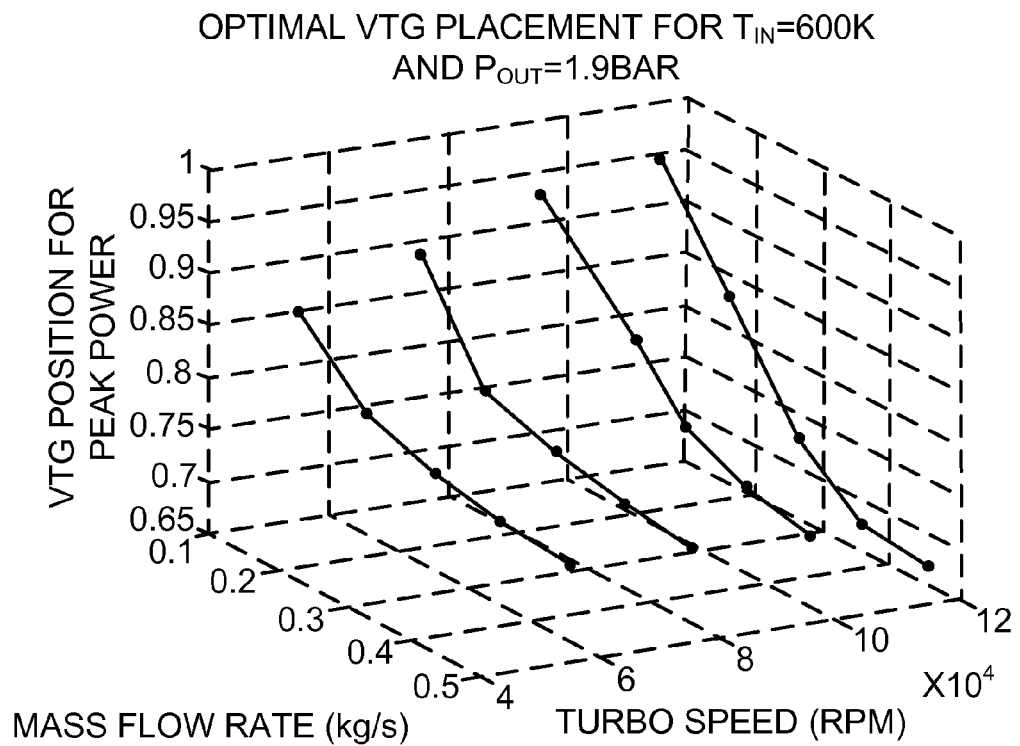
FIG. 3 shows a 3D representation of the relationship between VTG area and engine operating parameters.

There are a number of ways to determine optimal VTG area. One way is to use turbine maps similar to those shown in FIG. 3 in which the Y axis shows the VTG area for peak power as a function of mass flow rate and turbo speed in rpm. This shows that the optimal VTG area to produce maximum power follows a position depending upon the flow conditions. The flow conditions are turbine mass flow rate W, turbine inlet temperature, turbo speed in rpm, and exit pressure.

Figure 4:
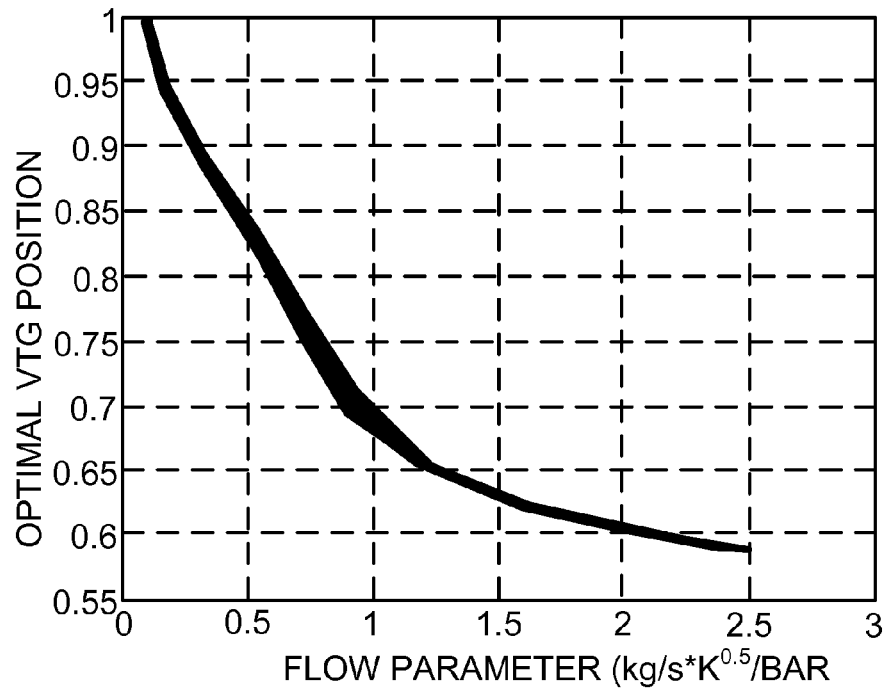
FIG. 4 is one mode of operating the turbine inlet area to achieve maximum response.

Another method for determining optimal VTG area is shown in FIG. 4, where control of VTG area may be narrowed to a single curve in which the optimal VTG area as shown on the Y axis and the flow parameter is shown on the X axis. The flow parameter consists of the turbine mass flow rate and inlet temperature and inlet pressure.

To achieve these measurements, the system has sensors 72 and 74 determining turbine inlet temperature and pressure respectively. Sensors 72 and 74 connect to ECU 26 by lines 76 and 78 respectively. An additional sensor 80 determines turbine exhaust pressure and is connected to the ECU 26 by line 82. An additional sensor 84 determines turbine speed (rpm) and feeds it to the ECU 26 by a line (not shown) to simplify the drawing.

Figure 5:
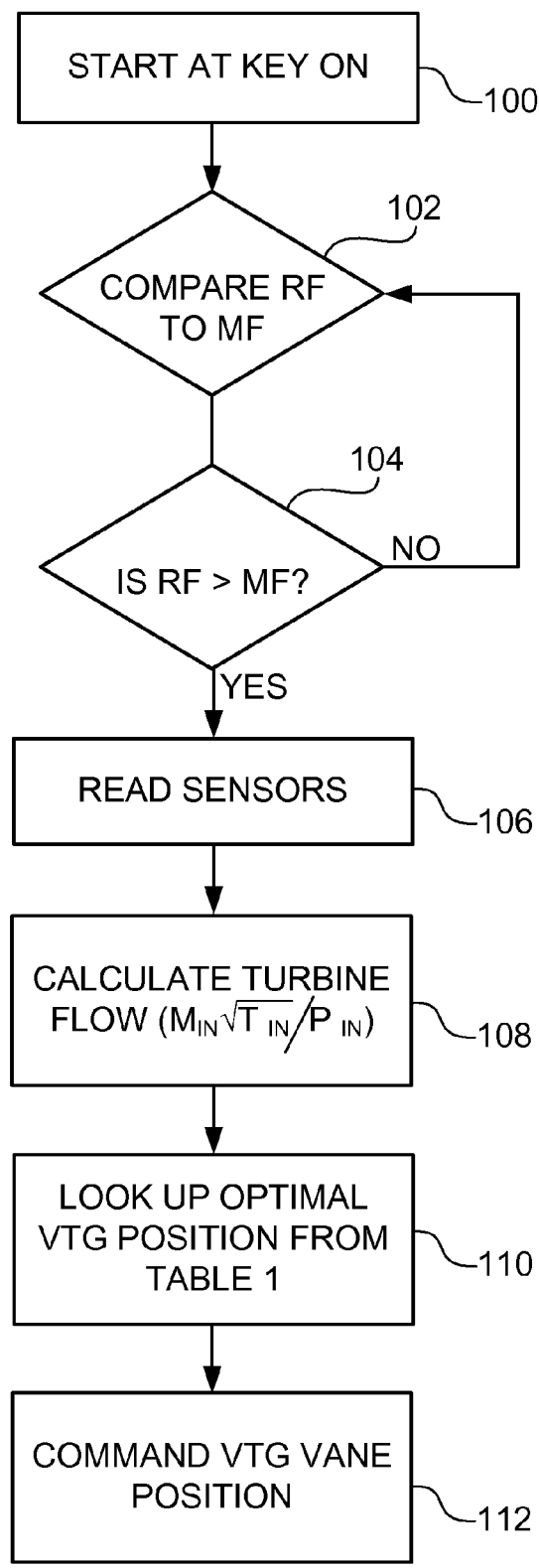
FIG. 5 is a flow chart of the logic diagram of the control method embodied in the present invention.

FIG. 5 shows the flow logic for the control system set forth above. At step 102, the requested fueling through operator control 62 is compared to maximum fueling set in logic tables in ECU 26. If the answer is that requested fueling is greater than maximum fueling at step 104, then at step 106 the sensors are read. At step 108, turbine mass flow is calculated using any combination of sensors to estimate or determine turbine inlet temperature, turbine mass flow, and turbine inlet pressure. For example, the fresh air measurement from turbine compressor 42 and estimated fueling from the fuel system 24 could be used to calculate turbine mass flow along with direct measurement of turbine inlet temperature and pressure. When the turbine flow is determined, the optimal VTG position is looked up either from the curve in FIG. 4 or the map in FIG. 3 in step 110. In step 112, a command is issued to the variable area inlet 34 via line 60 to achieve the appropriate VTG area.

Such a logic allows the turbine inlet area to be at a level that produces optimal power which, in turn, translates to the more rapid acceleration and response of an increase in compressor output pressure. Unlike prior control schemes that either conservatively limit the reduction in area to an unnecessarily high opening or others that reduce the area too much, which has the unintended effect of producing less power, the above method provides an opening that is precisely at the point at which pressure ratio and efficiency balance to achieve maximum turbine power.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling the variable turbine geometry (VTG) of a turbocharger turbine having a variable area inlet and produces a pressure ratio for an operator controlled, air breathing, fuel consuming, compression ignition, internal combustion engine, having an operator controlled fuel rate and a maximum permitted fueling rate, to produce maximum transience response, said method comprising the steps of:

determining if operator controlled fueling rate exceeds the maximum permitted fueling rate;

calculating the pressure ratio of said turbine as a function of the inlet area of said VTG, calculating turbine efficiency as a function of the inlet area of said VTG, determining the balance condition between pressure ratio and efficiency and commanding the VTG inlet area as a direct function of said balance condition.

2. The method of claim 1, wherein the step of calculating includes determining instantaneous turbine mass flow rate (W), determining instantaneous turbine inlet temperature ($T_i$), determining turbine exit pressure ($P_o$), and using said W, $T_i$ and $P_o$ values to calculate the balance condition of said pressure ratio and turbine efficiency.

3. The method of claim 2, wherein a look up table is provided to determine the calculations made in claim 2.

4. The method of claim 2, wherein the intersection of the curves of said W, $T_i$ and $P_o$ is defined by a single curve indicating VTG area as a function of a flow parameter.

5. The method of claim 4, wherein said flow parameter is turbine mass flow rate (W) times the square root of turbine inlet temperature over the turbine inlet pressure.

6. The method of claim 2 including the step of estimating turbine mass flow, turbine inlet temperature and turbine inlet pressure.

7. The method of claim 6 wherein fresh air flow to the engine is measured plus estimated fueling to calculate turbine mass flow rate (W).

8. The method of claim 1 wherein the engine has exhaust gas recirculation (EGR) and the VGT is controlled as a part of the EGR control strategy.

9. The method of claim 1 wherein the engine powers a work machine subject to step increases in power output and said method produces maximum responsiveness.

* * * * *